(12) United States Patent
Lovette

(10) Patent No.: US 7,005,458 B2
(45) Date of Patent: Feb. 28, 2006

(54) STATIC DISSIPATIVE POLYURETHANE FOAMS

(75) Inventor: Joseph W. Lovette, Newark, DE (US)

(73) Assignee: Foamex L.P., Linwood, PA (US)

( * ) Notice: Subject to any disclaimer, the term of this patent is extended or adjusted under 35 U.S.C. 154(b) by 195 days.

(21) Appl. No.: 10/601,088

(22) Filed: Jun. 20, 2003

(65) Prior Publication Data
US 2004/0259966 A1 Dec. 23, 2004

(51) Int. Cl.
C08G 18/48 (2006.01)

(52) U.S. Cl. .................. 521/174; 521/99; 521/123; 521/130; 521/134; 521/137; 521/170; 521/172; 521/173

(58) Field of Classification Search .............. 521/99, 521/123, 130, 134, 137, 170, 172, 173, 174
See application file for complete search history.

(56) References Cited

U.S. PATENT DOCUMENTS

| | | |
|---|---|---|
| 3,933,697 A | 1/1976 | Fujii et al. |
| 4,286,004 A | 8/1981 | Dahmen et al. |
| 4,605,684 A | 8/1986 | Pcolinsky, Jr. |
| 4,618,630 A | 10/1986 | Knobel et al. |
| 4,621,106 A | 11/1986 | Fracalossi et al. |
| 4,886,626 A | 12/1989 | Cope et al. |
| 5,096,934 A | 3/1992 | Roberts et al. |
| 5,567,740 A | 10/1996 | Free |
| 5,656,344 A | 8/1997 | Sawa et al. |
| 5,677,357 A | 10/1997 | Spicher |
| 5,834,116 A | 11/1998 | Sawa et al. |
| 5,855,818 A | 1/1999 | Gan et al. |
| 5,933,693 A | 8/1999 | Sakata et al. |
| 5,955,526 A | 9/1999 | Spicher |
| 6,023,597 A | 2/2000 | Mayuzumi et al. |
| 6,136,878 A | 10/2000 | Free et al. |
| 6,136,879 A * | 10/2000 | Nishida et al. ............ 521/174 |
| 6,204,300 B1 * | 3/2001 | Kageoka et al. ............ 521/174 |

FOREIGN PATENT DOCUMENTS

| | | |
|---|---|---|
| WO | WO-00/17262 A1 | 3/2000 |
| WO | WO-02/068489 A1 | 9/2002 |

* cited by examiner

Primary Examiner—John M. Cooney
(74) Attorney, Agent, or Firm—Connolly, Bove, Lodge & Hutz LLP

(57) ABSTRACT

A static dissipative flexible polyurethane foam is formed under free rise expansion conditions from a polyether graft polyol and an isocyanate, wherein one or more anti-static additives are incorporated into the reaction mix in an amount from 0.10 to 20 parts by weight. Water is added in an amount of from 0.2 to 1.0 parts per weight. Upon curing, the foam has a density in the range of 6 to 20 pounds per cubic foot, a surface resistivity below $1 \times 10^{11}$ ohms/square, and a pore size in the range of 100 to 250 pores per inch. The foam may be fabricated (cut or shaped) to form a shaped article, such as a roller, a clean room wipe, a cosmetic applicator or a packaging element.

17 Claims, No Drawings

STATIC DISSIPATIVE POLYURETHANE FOAMS

BACKGROUND OF THE INVENTION

The present invention relates to static dissipative polyurethane foam suitable for making rollers that electrostatically control the object to be contacted, such as toner transfer rollers, charging rollers, development rollers and cleaning rollers used in a printer for electrophotography and electrostatic recording systems. Such foams also find use in other applications, such as cosmetic pads, clean room wipes and electrical component packaging.

Rollers are used for example in the development mechanism and the cleaning mechanism of electrophotographic systems. Such rollers should be stable over different environmental conditions, such that conductivity or static dissipative characteristics do not fluctuate substantially. For example, surface resistivity should remain within one order of magnitude, i.e., between $1\times10^8$ ohms/square and $1\times10^9$ ohms/square when the ambient conditions are between 5° C. at 30% relative humidity and 30° C. at 85% relative humidity.

Surface resistivity is the ratio of DC voltage drop per unit length to the surface current per unit width. In effect the surface resistivity is the resistance between two opposite sides of a square and is independent of the size of the square or its dimensional units. Generally, conductive materials have surface resistivity values of less than $1\times10^3$ ohms/square, static dissipative materials have surface resistivity values less than $1\times10^{12}$ ohms/square and insulative materials have surface resistivity values of greater than $1\times10^{12}$ ohms/square. Untreated polyurethane foams are most commonly insulative materials with surface resistivities greater than $1\times10^{14}$ ohms/square, and even greater than $1\times10^{17}$ ohms/square. Such surface resistivity classifications are found in ASTM Test method D-257. diisocyanate, and a quaternary ammonium salt is added to the foaming mix to impart electroconductivity. The resulting foams have volume electrical resistivity from $1\times10^6$ ohm-cm to $1\times10^{11}$ ohm-cm.

U.S. Pat. No. 5,677,357 suggests adding an anti-statically-effective amount of an inorganic hexahalogenated compound to a polyurethane composition. U.S. Pat. No. 5,955,526 teaches adding a hexahalogenated phosphate compound to a polyurethane composition. The resulting polyurethane foams in these patents are reported to have surface resistivities in the static dissipative range, i.e., below $1\times10^{12}$ ohms/square.

For rollers formed from polyurethane foams, in addition to surface resistivity, other important parameters are foam density, hardness and cell size. Commonly, rollers are fabricated by foaming the foam within an enclosed mold cavity. The contours of the mold cavity closely approximate the desired shape of the finished roller. With such molding, the foam can develop with higher densities, e.g., greater than 10 pounds per cubic foot (160 kg/m³).

Moreover, foams with finer cell sizes, e.g., greater than 100 pores per inch, exhibit better electroconductivity. Such foams with finer cell size are also desired for other applications, such as clean room wipes and cosmetic applicators.

Fabricating rollers and other shaped polyurethane foam parts by molding generally is more expensive than fabricating such rollers and parts from free rise foams. "Molded" herein means reacting the foam-forming ingredients while they are confined within an enclosed mold cavity. The molded parts require preparation of molds tailored to the specific dimensions of the roller or part structure. A new mold must be built to create a new shaped foam roller or part. The foam properties can vary through the volume and across the surface of the molded foam part.

Volume resistivity is the ratio of the DC voltage per unit thickness to the amount of current per unit area passing through a material. Volume resistivity is generally given in ohm-cm.

Electroconductive or static dissipative polyurethane foams are known and have been produced by various methods, including:

(a) blending electroconductive carbon (or other metallic) particles with a mixture of polyol, isocyanate(s), catalyst(s), water and foaming agent(s) when foaming the polyurethane foam to form a conductive or static dissipative foam in situ;

(b) impregnating a polyurethane foam with a carbon paint or liquid solution containing electroconductive carbon (or other metallic) particles; and (c) adding ionic anti-static agents to the polyurethane foam-forming mix to form a conductive or static dissipative foam in situ.

U.S. Pat. No. 5,656,344 discloses an electroconductive polyurethane foam for the surface of a printer roller. The foam incorporates electroconductive metal powders, preferably carbon or graphite, and ionic conductive material such as metal salts or other anti-static agents. The resulting foam has a volume resistivity in the range of $1\times10^6$ to $1\times10^{11}$ ohm-cm. Such volume resistivity is stated to remain stable such that it does not fluctuate more than one order of magnitude for a range of ambient conditions from about 5° C. at 30% relative humidity to about 35° C. at 85% relative humidity. The foams are molded to form rollers.

U.S. Pat. No. 5,933,693 discloses other molded electroconductive polyurethane foams and elastomers that may be used to form rollers for electrophotographic or electrostatic recording processes. The foam is formed with specific modified or hydrogenated diphenyl methane Molded foam parts commonly have a densification or skin formed at the outer surface that was in contact with the mold.

In contrast, free rise foam is formed into a large-sized bun with generally consistent properties through the volume of the bun. "Free rise" herein means unhampered expansion of the foam in an open container or on a moving conveyor with no top. The container or conveyor may be within a pressure-controlled environment, but there is no surface equivalent to a mold surface limiting foam expansion. After curing, the free rise foam can be shaped or fabricated on standard equipment by machining, cutting, peeling, embossing, or other mechanical or mechanical-thermal means to form rollers or other shaped parts.

Lower cost static dissipative polyurethane foams with sufficiently high density, desired hardness, sufficiently fine cell size and sufficiently stable surface resistivities are still sought for rollers and other applications.

SUMMARY OF THE INVENTION

A first aspect of the invention is a method for making a flexible polyurethane foam under free rise conditions. A polyether graft polyol or an ester polyol having a number average molecular weight of from about 500 to about 8000, or a mixture thereof, is mixed at a mix head with an isocyanate selected from the group consisting of diphenylmethane 4,4' diisocyanate, diphenyl methane 2,2' diisocyanate, diphenylmethane 2,4' diisocyanate, toluene diisocyanate, higher molecular weight isocyanate oligomers, and mixtures thereof, to form a reaction mix. One or more polyether polyols may be mixed with the graft polyol or ester polyol, and in such mixtures with graft polyol, the graft polyol preferably is present in an amount at least 20 parts per hundred parts of the polyol component. One or more MDI is the preferred isocyanate. Water is the preferred blowing agent in an amount from 0.2 to 1.0 parts per weight per hundred parts polyol.

One or more anti-static additives selected from the group consisting of quarternary ammonium compounds, metallic salts, complexes of metallic salts with polyhydric alcohols and their derivatives, complexes of metallic salts with mono-ols, hexahalogenated ionic compounds, and carbon black, and mixtures thereof, are added to the reaction mix, either separately or as part of a prepolymer mix with the graft polyol. Preferably, the anti-static additives are added in an amount from 0.10 to 20 parts by weight per hundred parts polyol.

Preferably, other additives such as surfactants, stabilizers, catalysts, cross-linkers, fire retardants, antimicrobial compounds, extender oils, dyes and pigments, may be added to the foam-forming mixture at the mix head.

The foam-forming mixture so formed is then presented to an open container or a moving conveyor to permit free rise expansion of the polyurethane foam. Upon curing, the polyurethane foam has a density in the range of 6 to 20 pounds per cubic foot, a surface resistivity below $1 \times 10^{11}$ ohms/square, and a pore size in the range of 100 to 250 pores per inch. Preferably, the surface resistivity of the polyurethane foam is from $1 \times 10^7$ ohms/square to $1 \times 10^9$ ohms/square, and the density of the polyurethane foam is from 7 to 9 pounds per cubic foot.

A second aspect of the invention is a method for making a shaped polyurethane foam part. The free rise polyurethane foam made according to the inventive method is then fabricated into a shaped article, such as a roller, a cosmetic applicator, a clean room wipe or a packaging element. Such fabrication comprises one or more of grinding, slicing, die-cutting, machining, peeling, convoluting, laser cutting, water pressure cutting or otherwise shaping by cutting.

DESCRIPTION OF THE PREFERRED EMBODIMENTS

In general, polyurethane foams are prepared by reacting a polyol with a polyisocyanate in the presence of a catalyst, a blowing agent, one or more foam stablizers or surfactants and other foaming aids. In the present invention, the polyol preferably is a polyether graft polyol, although ester polyols may also be used, and polyether polyols may be mixed with the polyether graft polyol or ester polyol.

Polyether polyols used to prepare flexible polyurethane foams typically have molecular weights between 500 and 8000 (i.e., number average molecular weight measured by gel permeation chromatography). One example of such polyether polyol is Voranol 3010 from Dow Chemical (having a reported molecular weight of about 3000±100, which is determined by a formula which corresponds well to number average molecular weight measured by gel permeation chromatography), and a hydroxyl number ("OH") of 56 mg KOH/g with an EO content of 8.5%. Another example is Pluracol 1103 from BASF (having a reported molecular weight measured of about 3100 which is determined by a formula which corresponds well to number average molecular weight measured by gel permeation chromatography).

The following paragraph provides a more detailed description of these polyols but is not intended to be limiting.

The term polyether polyol includes linear and branched polyether (having ether linkages) and containing at least two hydroxyl groups, and includes polyoxypropylene polyether polyol or mixed poly(oxyethylene/oxypropylene)polyether polyol. Preferred polyethers are the polyoxyalkylene polyols, particularly the linear and branched poly (oxyethylene)glycols, poly(oxypropylene)glycols and their co-polymers.

Graft or modified polyether polyols are those polyether polyols having a polymer of ethylenically unsaturated monomers dispersed therein. Representative modified polyether polyols include polyoxypropylene polyether polyol into which is dispersed poly(styrene acrylonitrile) or polyurea, and poly(oxyethylene/oxypropylene)polyether polyols into which is dispersed poly(styrene acrylonitrile) or polyurea. Graft or modified polyether polyols contain dispersed polymeric solids. The solids increase hardness and mechanical strength of the resultant foam. Especially preferred graft polyols in this invention are Arcol HS-100 from Bayer AG and Voranol 3943 from Dow. Modified polyether polyols are commercially available from several companies, including Arco, now Bayer (supplied as "Polymer Polyol" or "PHD Polyol"), BASF (supplied as "Graft Polyol"), and Dow Chemical (supplied as "Co-polymer Polyol). Bayer ("Polymer Polyol"), BASF, and Dow disperse poly(styrene acrylonitrile) into the polyol, whereas Bayer ("PHD Polyol") disperses polyurea therein.

Ester polyols include polymeric polyols containing a number of ester groups in the main or side chains. Ester polyols are commercially available from Witco Chemical (supplied as "Fomrez 50") and from Inolex (supplied as "1102-50"). 1102-50 is a 50 hydroxyl triol ester polyol with a molecular weight of about 3000.

The polyol component may comprise a mixture of a polyether graft polyol with an ester polyol, or a mixture of a polyether graft polyol with a polyether polyol, or a mixture of an ester polyol with a polyether polyol. Where a polyether polyol is mixed with a polyether graft polyol, preferably the polyether graft polyol comprises at least 20 parts by weight per hundred parts polyol of the polyol component.

The "hydroxyl number" for a polyol is a measure of the amount of reactive groups available for reaction. The value is reported as the number of milligrams of potassium hydroxide equivalent to the hydroxyl groups found in one gram of the sample. "Functionality" of a polyol is defined as the average number of hydroxyl groups sites per molecule.

The term "polyisocyanate" refers particularly to isocyanates that have previously been suggested for use in preparing polyurethane foams. Polyisocyanates include di- and polyisocyanates and prepolymers of polyols and polyisocyanates having excess isocyanate groups available to react with additional polyol. The amount of polyisocyanate employed is frequently expressed by the term "index" which refers to the actual amount of isocyanate required for reaction with all of the active hydrogen-containing compounds present in the reaction mixture multiplied by 100. For most foam applications, the isocyanate index is in the range of between about 75 to 140. In this invention, the preferred isocyanate index is in the range of 95 to 110, most preferably 100 to 105. The polyisocyanate component used is about 10 to 30 parts by weight per 100 parts by weight of the polyol component.

The polyisocyanates include aromatic and aliphatic polyisocyanates each containing at least two isocyanate groups in a molecule, and modified products thereof. The methylene diisocyanates suitable for use are diphenyl methane diisocyanate and polymethylene polyphenyl isocyanate blends (hereinafter sometimes referred to as "MDI" or "polymeric MDI"). The MDI blends can contain diphenylmethane 4,4' diisocyanate as well as the 2,2' and 2,4' isomers and higher molecular weight isocyanate oligomers, and have an isocyanate functionality of from about 2.1–2.7, preferably from about 2.1–2.5. As used herein, the term "isocyanate functionality" means the molar average number of isocyanate groups per molecule of the blends.

Preferably, MDI comprises the only polyisocyanate used in the foaming mixture. However, toluene diisocyanate can also be used. Commercially available toluene diisocyanates generally constitute one of the following isomer blends: 80% 2,4 toluene diisocyanate with 20% 2,6 toluene diisocyanate; or 65% 2,4 toluene diisocyanate with 35% 2,6 toluene diisocyanate. Other higher molecular weight isocyanate oligomers may also be used.

Catalysts are used to control the relative rates of water-polyisocyanate (gas-forming) and polyol-polyisocyanate (gelling) reactions. The catalyst may be a single component or in most cases a mixture of two or more compounds. Preferred catalysts for polyurethane foam production are organotin salts and tertiary amines. The amine catalysts are known to have a greater effect on the water-polyisocyanate reaction, whereas the organotin catalysts are known to have a greater effect on the polyol-polyisocyanate reaction.

Catalysts in this invention include amine catalysts, such as triethylene-diamine, imidazoles and tin catalysts, such as stannous octoate. Catalysts are preferably present in amounts from 0.1 to 1.0 parts by weight for amine catalyst, and 0 to 0.5 parts by weight for tin catalyst, based on 100 parts by weight of the polyol component. Other catalysts may be included in the foam-forming mixture, such as gel catalysts often used as replacements for tin catalysts, including zinc octoate or potassium octoate. Preferably, catalysts are incorporated in a pure or concentrated form to avoid introducing carriers or reactive carriers into the foam-forming mixture, which carriers may leave undesirable residuals in the resulting foam structure.

One or more stabilizers or surfactants are also included in the foam-forming composition. The surfactants lower the bulk surface tension, promote nucleation of bubbles, stabilize the rising cellular structure and emulsify incompatible ingredients. Stablizers in the present invention include silicone foam stabilizers or surfactants, and may be present in amounts from 0.5 to 2.0 parts by weight, preferably from 0.5 to 1.0 parts by weight, based on 100 parts by weight of the polyol component.

A blowing agent may be included in the foam-forming composition. The most typical blowing agent is water, which is added in an amount suitable to achieve a desired foam density. The amount may vary depending upon the operating pressure during foaming. In this invention, water is added as a blowing agent, typically in an amount of about below 1.0 parts by weight, preferably from 0.2 to 1.0 parts by weight, per 100 parts by weight of the polyol component. Water is the preferred blowing agent, but auxiliary blowing agents may be introduced into the foam-forming mixture in some circumstances.

Anti-static agents or additives are included in the foam-forming composition in an anti-statically effective amount to cause the resulting polyurethane foam to have a surface resistivity of less than $1 \times 10^{11}$ ohms/square, preferably from $1 \times 10^7$ ohms/square to $1 \times 10^9$ ohms/square. Representative anti-static agents that may be included in the reaction mixture include quarternary ammonium compounds such as disclosed in U.S. Pat. No. 5,933,693, including but not limited to quarternary ammonium salts of alkyl sulfuric acid and carboxylic acid; metallic salts of lithium, sodium, potassium, ammonium, calcium, and barium; complexes of metallic salts with polyhydric alcohols and their derivatives, such as 1,4 butanediol, ethylene glycol, propylene glycol and polyethylene glycol, and complexes of metallic salts with mono-ols such as ethylene glycol monomethyl ether and ethylene glyco monoethyl ether; hexahalogenated ionic compounds such as disclosed in U.S. Pat. No. 5,677,357, including hexahalogenated phosphate compounds, such as potassium hexafluorophosphate, sodium hexafluorophosphate and ammonium hexafluorophosphate; and carbon black. The anti-static agents may be incorporated into the polyol component directly at the mix head or in advance of presenting the polyol to the mix head. The anti-static agents are added in amounts from 0.1 to 20 parts per hundred parts polyol.

A2020 is a commercially available metallic salt anti-static additive composition offered by ChemFoam. A2020 contains from 4.5 to 5.0% of the active metallic salt that is carried by diglyme (2-methoxyethylether) and triol, and has OH #48. Other commercially available metallic salts include AT20 by OSi Specialty, which contains 5.0% of the active metallic salt carried by diglyme and polyether (OH #46), and Catafor PU by Dow Chemical, which contains 4.5% of the active metallic salt, diglyme and butanediol (OH #48).

Cross-linking agents may be included in the foam-forming composition to enhance processing and foam stability. Typically, cross-linking agents are relatively small molecules containing 2 or 3 active hydrogen groups, and are added in amounts from 0 to 25 parts per hundred parts polyol. Representative cross-linking agents that may be included in the reaction mixture include diethanolamine (DEOA), ethylene glycol (EG), diethylene glycol (DEG), triethylene glycol (TEG), propylene glycol (PG), dipropylene glycol (DPG), 1,4 butanediol (BDO), commercially available as Bayer AG DP1022 and R2580.

Optionally, other additives may be incorporated into the foam-forming composition. The optional additives include, but are not limited to, fire retardants, stabilizers, antimicrobial compounds, extender oils, dyes, and pigments. Such additives should not have a detrimental effect on the properties of the final polyurethane foam.

The foam-forming process may be carried out batch-wise, semi-continuously or continuously. The components are concurrently introduced to a mixing head and mixed together to cause a foaming reaction. Extra air or Carbon dioxide may be incorporated into the mixture at the mix head to control the foam cell diameter in the resulting foam. The mixture is then introduced into an open container or onto a moving conveyor to permit free rise expansion of the foam. Preferably, the free rise expansion is carried out under ambient temperature and pressure, but foaming under controlled pressure and temperature conditions is still within the scope of the free rise foaming intended with the present inventive method. The foaming mixture is allowed to rise and cure. The cured foam has pore sizes above 100 pores per linear inch, preferably in the range of about 100 to 250 pores per inch.

After the foam has cured, preferably under ambient conditions for at least 12 hours, preferably at least 24 hours, it may be fabricated into a shaped part, such as a roller, cosmetic applicator, clean room wipe or packaging insert.

The foam slab formed on a moving conveyor may be cut to smaller pieces for further processing. The foam may be shaped by a number of different methods known to persons skilled in the art, including slicing, die cutting, grinding, peeling, machining, convoluting, embossing, laser cutting, water pressure cutting or other shaping by cutting or any combination of these fabrication techniques, to form a shaped part. For example, to form a roller, a shaft may be inserted longitudinally into the core portion of a cut piece and the shaft with foam is then mounted onto cutting or grinding equipment. As the shaft is rotated, portions of foam may be removed from the surface of the cut piece of foam to form the outer surface of the roller.

The invention is further illustrated, but not limited by, the following examples.

EXAMPLES

Table 1 sets out the components and the amounts used to prepare static dissipative polyurethane foams according to the invention (Examples 1 to 4). Foams were prepared batch-wise in a pilot plant scale in a fixed head foam machine. The polyol component(s) and other ingredients were mixed together first, then this mixture was introduced to the mixing head with the polyisocyanate(s). The mixture was poured onto a moving conveyor on a pilot plant scale, and allowed to rise and cure for 24 hours.

CFD or "compression force deflection" was determined in accordance with a procedure similar to ASTM D 3574. In this case, for CFD at 25%, foam was compressed by 25% of its original height and the force was reported after one minute. The foam samples were cut to a size of 15"×15"×4" prior to testing. CFD is a measure of hardness of the foam and is reported in pounds per square inch (psi).

Tensile strength and elongation were determined in accordance with the procedure set out in ASTM D 3574. The foam was die cut to form a test specimen with a length of 5.5", width of 1" and a narrowed central portion with a width of about 0.5". The specimen was pulled at both ends until rupture. The tensile strength is calculated by dividing the breaking force by the original cross-sectional area of the central portion of the specimen. Tensile strength is reported in pounds per inch. The elongation is determined in percent by dividing the original specimen length by the maximum length distance the specimen stretched before rupture.

Tear strength was determined using the ASTM D 3574 test procedure. A 6" long, 1" wide and 1" thick specimen has a slit formed in one end. The specimen is pulled apart at the slit until it ruptures or at least 50 mm in length is torn. The tear strength is calculated from the maximum force registered on the testing machine divided by the specimen thickness. Tear strength is reported in pounds per inch.

Surface resistivity was determined by the test procedure set out in ANSI/EOS/ESD-S11.11-1993 "Surface Resistance Measurement of Static Dissipative Planar Materials". A conditioned specimen of the sample material (12% relative humidity −23 ° C.) was supported on a flat insulative surface. An electrode assembly placed at the approximate center of the specimen was energized to 100 volts and the surface resistance (ohms) was recorded after an appropriate electrification time. The surface resistance was then converted to surface resistivity (in ohms/square) by multiplying the surface resistance by the conversion factor 10.

TABLE 1

| Example | 1 | 2 | 3 | 4 | 5 | 6 | 7* | 8 |
|---|---|---|---|---|---|---|---|---|
| Arcol HS-100 (Bayer AG) polyether graft polyol | 33 | 68 | 93 | 93 | 78 | 90.5 | 100 | 100 |
| Voranol 3010 (Dow Chemical) polyether polyol | 60 | 25 | 0 | 0 | 0 | 0 | 0 | 0 |
| TEG (triethylene glycol) (Dow Chemical) cross-linking agent | 0 | 0 | 0 | 0 | 15 | 0 | 0 | 0 |
| L-620 (OSI Specialty) silicone surfactant | 0.75 | 0.75 | 0.75 | 0.75 | 0.75 | 1.0 | 0 | 0.75 |
| L-618 (OSI Specialty) silicone surfactant | 0 | 0 | 0 | 0 | 0 | 0 | 0.8 | 0 |
| A-1 (OSI Specialty) amine catalyst | 0.38 | 0.44 | 0.44 | 0.44 | 0.44 | 0.3 | 0.16 | 0.30 |
| K29 (Goldschmidt) tin catalyst | 0.15 | 0.4 | 0.5 | 0.3 | 0.11 | 0.15 | 0.12 | 0.20 |
| A2020 (ChemFoam) metallic salt - anti-static agent | 7.0 | 7.0 | 7.0 | 7.0 | 7.0 | 10.0 | 0 | 0 |
| Catafor PU (Dow Chemical) metallic salt- anti-static agent | 0 | 0 | 0 | 0 | 0 | 0 | 0 | 7.0 |
| AT-20 (OSI Specialty) metallic salt- anti-static agent | 0 | 0 | 0 | 0 | 0 | 0 | 5.0 | 0 |
| Water | 0.7 | 0.55 | 0.58 | 0.55 | 0.55 | 0.8 | 0.8 | 1.00 |
| 7050 (Huntsman) MDI - isocyanate | 20.5 | 0 | 0 | 15.3 | 41.19 | 0 | 0 | 20.1 |
| TD-65 (Dow Chemcial) TDI - isocyanate | 0 | 10.5 | 10.2 | 0 | 0 | 13.1 | 0 | 0 |
| TD-80 (Dow Chemical) TDI - isocyanate | 0 | 0 | 0 | 0 | 0 | 0 | 12.1 | 0 |
| Isocyanate Index | 100 | 95 | 100 | 105 | 105 | 102 | 100 | 95 |
| Density (pcf) | 7.0 | 7.3 | 7.4 | 9.2 | 8.1 | 6.2 | 6.9 | 6.1 |
| Pore Size (ppi) | 200 | >100 | >100 | 200 | 200 | — | — | — |
| Tensile Strength (lb/in) | 22.1 | 43.8 | 64.7 | — | — | — | — | — |
| Percent Elongation (%) | 128 | 130 | 131 | — | — | — | — | — |
| Tear Strength (lb/in) | 0.9 | 1.52 | 3.4 | — | — | — | — | — |

TABLE 1-continued

| Example | 1 | 2 | 3 | 4 | 5 | 6 | 7* | 8 |
|---|---|---|---|---|---|---|---|---|
| CFD (at 25%) (lb/in$^2$) | 1.0 | 2.4 | 2.9 | 6.8 | 9.94 | 2.65 | — | — |
| Surface Resistivity (ohms/square) | $1 \times 10^8$ | $1 \times 10^8$ | $1 \times 10^8$ | $1 \times 10^8$ | $1 \times 10^8$ | $6 \times 10^8$ | $1 \times 10^9$ | $6 \times 10^9$ |

*Example 7 was made as a hand mix. If data is not reported, the parameter was not measured.

The invention has been illustrated by detailed description and examples of the preferred embodiments. Various changes in form and detail will be within the skill of persons skilled in the art. Therefore, the invention must be measured by the claims and not by the description of the examples or the preferred embodiments.

I claim:

1. A method for making a flexible polyurethane foam, comprising:

mixing at a mix head to react (i) a polyether graft polyol or a polyether graft polyol mixed with an ester polyol and/or a polyether polyol, wherein said polyol or combination of polyols has a number average molecular weight of from about 500 to about 8000, with (ii) an isocyanate selected from the group consisting of diphenylmethane 4,4' diisocyanate, diphenyl methane 2,2' diisocyanate, diphenylmethmne 2,4' diisocyanate, toluene diisocyanate, higher molecular weight isocyanate oligomers, and mixtures thereof, with an isocyanate index in the range of 95 to 110 to form a reaction mix;

incorporating into the reaction mix water in an amount from 0.2 to 1.0 parts by weight per hundred parts polyol;

further incorporating into the reaction mix one or more anti-static additives in an amount from 0.1 to 20 parts by weight per hundred parts polyol, to form a foam-forming mixture; and presenting the foam-forming mixture to an open container or a moving conveyor to permit free rise expansion of the polyurethane foam; wherein, upon curing, the polyurethane foam has a density in the range of 6 to 20 pounds per cubic foot, a surface resistivity below $1 \times 10^{11}$ ohms./square as determined at 12% relative humidity and 23° C., and a pore size in the range of 100 to 250 pores per inch.

2. The method of claim 1, wherein the anti-static additive is selected from the group consisting of: quarternary ammonium compounds, metallic salts, complexes of metallic salts with polyhydric alcohols and their derivatives, complexes of metallic salts with mono-ols, hexahalogenated ionic compounds, and carbon black.

3. The method of claim 1, wherein the graft polyol comprises at least 20 parts by weight per hundred parts of the polyol component of the reaction mix.

4. The method of claim 1, further comprising incorporating into the reaction mix at the mix head a cross-linking agent selected from the group consisting of diethanolamine (DEOA), ethylene glycol (EG), diethylene glycol (DEG), triethylene glycol (TEG), propylene glycol (PG), dipropylene glycol (DPG), 1,4 butanediol (BDO), and mixtures thereof, and in an amount from 0 to 25 parts by weight per hundred parts polyol.

5. The method of claim 1, wherein the surface resistivity of the polyurethane foam is from $1 \times 10^7$ ohms/square to $1 \times 10^7$ ohms/square as determined at 12% relative humidity and 23° C.

6. The method of claim 1, wherein the density of the polyurethane foam as from 7 to 9 pounds per cubic foot.

7. The method of claim 1, wherein the isocyanate is diphenylmethane 4,4' diisocyanate or diphenylmethmne 2,2' diisocyanate or diphenylmethane 2,4' diisocyanate, or mixtures thereof.

8. A method for making a shaped polyurethane foam part, comprising:

mixing at a mix head to react (i) a polyether graft polyol or polyol mixed with ester polyol and/or a polyether polyol, wherein said polyol or combination of polyols has a number average molecular weight of from about 500 to about 8000, with (ii) an isocyanate selected from the group consisting of diphenyl 4,4' diisocyanate, diphenylmethane 2,2' diisocyanate, diphenylmethane 2,4' diisocyanate, toluene diisocyanate, higher molecular weight isocyanate oligomers, and mixtures thereof, to form a reaction mix;

incorporating into the reaction mix water in an amount from 0.2 to 1.0 parts by weight per hundred parts polyol;

further incorporating into the reaction mix one or more anti-static additives in an amount from 0.1 to 20 parts by weight per hundred parts polyol, to form a foam-forming mixture;

presenting the foam-forming mixture to an open container or a moving conveyor to permit free rise expansion of the polyurethane foam, wherein, upon curing, the polyurethane foam has a density in the range of 6 to 20 pounds per cubic foot, a surface resistivity below $1 \times 10^{11}$ ohms/square as determined at 12% relative humidity and 23° C., and a pore size in the range of 100 to 250 pores per inch.; and fabricating the polyurethane foam into the shaped polyurethane foam part.

9. The method of claim 8, wherein the anti-static additive is selected from the group consisting of: quarternary ammonium compounds, metallic salts, complexes of metallic salts with polyhydric alcohols and their derivatives, complexes of metallic salts with mono-ols, hexahalogenated ionic compounds, and carbon black.

10. The method of claim 8, wherein the graft polyol comprises at least 20 parts by weight per hundred parts of the polyol component of the reaction mix.

11. The method of claim 8, further comprising incorporating into the reaction mix a cross-linking agent selected from the group consisting of: diethanolamine (DEOA), ethylene glycol (EG), diethylene glycol (DEG), triethylene glycol (TEG), propylene glycol (PG), dipropylene glycol (DPG), 1,4 butanediol (BDO), and mixtures thereof, and in an amount from 0 to 25 parts by weight per hundred parts polyol.

12. The method of claim 8, wherein the surface resistivity of the polyurethane foam is from $1 \times 10^7$ ohms/square to $1 \times 10^9$ ohms/square as determined at 12% relative humidity and 23° C.

13. The method of claim 8, wherein the density of the polyurethane foam is from 7 to 9 pounds per cubic foot.

14. The method of claim 8, wherein the isocyanate is diphenylmethane 4,4' diisocyanate or diphenylmethane 2,2' diisocyanate or diphenylmethane 2,4' diisocyanate, or mixtures thereof.

15. The method of claim 8, wherein fabricating comprises one or more of grinding, slicing, die-cutting, machining, peeling, convoluting, laser cutting, water pressure cutting or otherwise shaping by cutting.

16. A polyurethane foam produced by the method of claim 1.

17. A polyurethane foam part produced by the method of claim 8.

* * * * *

UNITED STATES PATENT AND TRADEMARK OFFICE
CERTIFICATE OF CORRECTION

PATENT NO. : 7,005,458 B2
APPLICATION NO. : 10/601088
DATED : February 28, 2006
INVENTOR(S) : Joseph W. Lovette It is certified that error appears in the above-identified patent and that said Letters Patent is hereby corrected as shown below:

In the Claims:

In Claim 1, at column 9, line 28, "diisocyanate, diphenylmethmne 2, 4' diisocyanate," should read -- diisocyanate, diphenylmethane 2, 4' diisocyanate, --

In Claim 5, at column 9, line 66, "$1 \times 10^7$ ohms/square as determined at 12% relative humidity" should read -- $1 \times 10^9$ ohms/square as determined at 12% relative humidity --

In Claim 8, at column 10, line 20, "or polyol mixed with ester polyol and/or a polyether" should read -- or a polyether graft polyol mixed with ester polyol and/or a polyether --

Signed and Sealed this

Eighteenth Day of July, 2006

JON W. DUDAS
*Director of the United States Patent and Trademark Office*